(12) United States Patent
Yang et al.

(10) Patent No.: US 7,108,741 B2
(45) Date of Patent: Sep. 19, 2006

(54) ANTIFOULING PAINT COMPOSITION

(75) Inventors: Kyung-Wook Yang, Suwon-si (KR);
Nam-Sik Park, Suwon-si (KR);
Ki-Seung Choi, Uiwang-si (KR);
Soon-Jong Hahn, Seoul (KR);
Jin-Man Kim, Suwon-si (KR);
Wan-Pyo Hong, Hwaseong-si (KR)

(73) Assignee: SK Chemicals Co., Ltd., Suwon-si (KR)

( * ) Notice: Subject to any disclaimer, the term of this patent is extended or adjusted under 35 U.S.C. 154(b) by 0 days.

(21) Appl. No.: 10/529,463

(22) PCT Filed: Oct. 23, 2003

(86) PCT No.: PCT/KR03/02243

§ 371 (c)(1),
(2), (4) Date: Mar. 28, 2005

(87) PCT Pub. No.: WO2004/037933

PCT Pub. Date: May 6, 2004

(65) Prior Publication Data

US 2006/0137566 A1    Jun. 29, 2006

(30) Foreign Application Priority Data

Oct. 24, 2002  (KR) .................. 10-2002-0065270
Oct. 31, 2002  (KR) .................. 10-2002-0067191

(51) Int. Cl.
C09D 5/16       (2006.01)
A01N 33/00      (2006.01)

(52) U.S. Cl. ................ 106/18.32; 106/15.05; 106/18.35; 106/18.36; 424/78.09; 523/122; 523/177

(58) Field of Classification Search ............ 106/15.05, 106/18.32, 18.35, 18.36; 424/78.09; 523/122, 523/177
See application file for complete search history.

(56) References Cited

U.S. PATENT DOCUMENTS 3,915,918 A   10/1975   Springle et al.

6,465,412 B1 * 10/2002 Mahieu et al. ............... 510/422

FOREIGN PATENT DOCUMENTS

| EP | 1 033 392 A2 | 9/2000 |
| JP | 10-279840 A | 10/1998 |
| JP | 10-279841 A | 10/1998 |
| JP | 2004-149496 A | * 5/2004 |
| KR | 2000-62680 A | 10/2000 |
| KR | 2001-64950 A | * 7/2001 |

\* cited by examiner

*Primary Examiner*—Anthony J. Green
(74) *Attorney, Agent, or Firm*—Birch, Stewart, Kolasch & Birch, LLP

(57) ABSTRACT

A novel antifouling paint composition is disclosed. The antifouling paint composition comprises a resin of 5 to 20 wt %, a solvent of 3 to 30 wt %; a polyhexamethyleneguanidine salt of the following chemical formula 1 of 0.05 to 20 wt %, a pigment of 1 to 50 wt %; and cuprous oxide of 22 to 75 wt % and/or zinc pyrithione of the following chemical formula 2 of 0.05 to 20 wt %;

[Chemical formula 1]

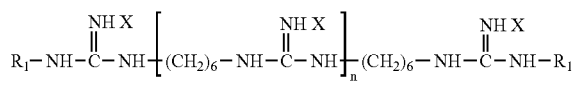

[Chemical formula 2]

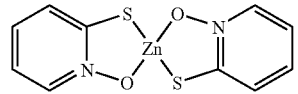

wherein in chemical formula 1, X can be the same or different, and at least one of X is an inorganic acid salt or an organic acid salt; $R_1$ can be the same or different, and is a linear or branched alkyl group containing from 1 to 20 carbon atoms, a phenyl group, a chlorophenyl group, a bromophenyl group, an iodophenyl group, a benzyl group, a chlorobenzyl group, a bromobenzyl group, a iodobenzyl group, a phenethyl group, a naphthyl group or a hydrogen; and n is an integer of 1 or more.

10 Claims, No Drawings

ANTIFOULING PAINT COMPOSITION

FIELD OF THE INVENTION

The present invention relates to an antifouling paint composition, and more particularly, to a novel antifouling paint composition which does not include organic tin compound causing contamination of seawater, but includes polyhexamethyleneguanidine salt and zinc pyrithione and/or cuprous oxide ($Cu_2O$).

BACKGROUNDS OF THE INVENTION

A lot of oceanic life, such as blue mussels, common turtle limpets, mosses, diatoms, oysters, pearl oysters, poriferans, turban shells, sea lettuces, sea squirts, and so on, live in the seawater, and the oceanic life conglutinate on undersea equipments, ships, life belts, harbor facilities, nurseries, fishing nets, and so on, which damages the sea equipments. Particularly, if the oceanic life conglutinate on the bottom of ship, the surface of ship becomes coarse, and requires frequent repair works. In addition, when the surface of ship becomes coarse by 0.01 mm, the fuel consumption of the ship increases by 0.3~1.0%. This may cause a more serious problem for a large vessel, in which 50% of the vessel operating costs is the fuel expenses.

To prevent such fouling of the sea equipments, an antifouling paint composition prepared by mixing a rosin, a plasticizer, and an antifouling agent with vinyl chloride resin or vinyl resin is conventionally used. However, the conventional antifouling paint composition also induces the seawater contamination because the composition includes mercury or organic tin compound as the antifouling agent. As other antifouling paint composition, U.S. Pat. No. 4,191,579 and British Patent No. 1,457,590 disclose a self-polishing antifouling paint composition in which an organic tin compound such as tributyl tin oxide binds to an unsaturated monomer such as acrylic acid or methacrylic acid to form an ester linkage therebetween. Due to the ester linkage, the antifouling paint composition is slowly hydrolyzed in seawater, and the organic tin compound is slowly released from the antifouling paint composition. The carboxylic group produced by releasing the organic tin compound forms a salt, which makes the antifouling paint to be water-soluble and to be swelled. Thereby, the surface of the antifouling paint is scaled off to reveal a new surface. Such antifouling paint composition is most commonly used for antifouling of the seawater equipments. However, the organic tin compound continuously released from the antifouling paint has a non-target toxicity, which not only induces the seawater contamination, but also destroys the ecosystem. Therefore, it is required to develop a new antifouling paint composition which is effective in preventing the fouling of the seawater equipment induced by the various oceanic life and microorganism, and does not have drawbacks in environmental and hygienic aspects.

SUMMARY OF THE INVENTION

Therefore, it is an object of the present invention to provide an antifouling paint composition which is not harmful for human-being and sea environment, and have superior antifouling effect on the organisms inducing the fouling.

It is other object of the present invention to provide an antifouling paint composition which is useful for preventing the fouling of sea equipments such as fishing nets, ships, undersea equipments, and so on, and does not include mercury or organic tin compound causing seawater contamination.

In order to achieve these and other objects, the present invention provides an antifouling paint composition comprising a resin of 5 to 20 weight %, a solvent of 3 to 30 weight %, polyhexamethyleneguanidine salt of the following chemical formula 1 of 0.05 to 20 weight %, a pigment of 1 to 50 weight %, and cuprous oxide ($Cu_2O$) of 22 to 75 weight % and/or zinc pyrithione of the following chemical formula 2 of 0.05 to 20 weight %.

[Chemical formula 1]

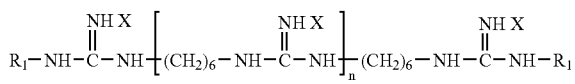

[Chemical formula 2]

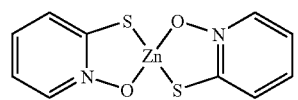

In chemical formula 1, X can be the same or different, and at least one of X is an inorganic acid salt or an organic acid salt; $R_1$ can be the same or different, and is a linear or branched alkyl group containing from 1 to 20 carbon atoms, a phenyl group, a chlorophenyl group, a bromophenyl group, an iodophenyl group, a benzyl group, a chlorobenzyl group, a bromobenzyl group, a iodobenzyl group, a phenethyl group, a naphthyl group or a hydrogen; and n is an integer of 1 or more. Preferably, X can be the same or different, and at least one of X is selected from the group consisting of HCl, HBr, HI, $HNO_3$, carbonic acid, sulfuric acid, phosphoric acid, acetic acid, benzoic acid, dehydroacetic acid, propionic acid, gluconic acid, sorbic acid, fumaric acid, maleic acid, and epichlorohydrin. Preferably, the solvent is xylene, methylethylketone, methylisobutylketone, or the mixtures thereof, and the pigment is titanium oxide, zinc oxide, iron oxide or the mixtures thereof. More preferably, the antifouling paint composition further includes a gelling agent of 1 to 5 weight % on the basis of total paint composition.

DETAILED DESCRIPTION OF THE INVENTION

A more complete appreciation of the invention, and many of the attendant advantages thereof, can be better appreciated by reference to the following detailed description.

The antifouling paint composition according to the present invention is desirable in environmental and hygienic aspects, and includes polyhexamethyleneguanidine salt of the following chemical formula 1 and zinc pyrithione of the following chemical formula 2 and/or cuprous oxide ($Cu_2O$).

[Chemical formula 1]

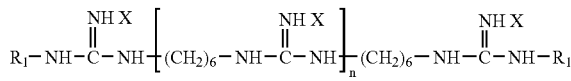

[Chemical formula 2]

In chemical formula 1, X can be the same or different, and at least one of X is an inorganic acid salt or an organic acid salt. Preferably, at least one of X is HCl, HBr, HI, $HNO_3$, carbonic acid, sulfuric acid, phosphoric acid, acetic acid, benzoic acid, dehydroacetic acid, propionic acid, gluconic acid, sorbic acid, fumaric acid, maleic acid, or epichlorohydrin, and more preferably, at least one of X is phosphoric acid. $R_1$ can be the same or different, and is a linear or branched alkyl group containing from 1 to 20 carbon atoms, a phenyl group, a chlorophenyl group, a bromophenyl group, an iodophenyl group, a benzyl group, a chlorobenzyl group, a bromobenzyl group, a iodobenzyl group, a phenethyl group, a naphthyl group or a hydrogen, and n is an integer of 1 or more.

The molecular weight of polyhexamethyleneguanidine salt is preferably 500 to 20,000, more preferably 800 to 10,000, and most preferably 900 to 5,000 considering the easy handling of the polyhexamethyleneguanidine salt, for example, uniform mixing of the salt with other components of the paint composition, easy production of the salt, duration of the antifouling property of the salt, and so on. Polyhexamethyleneguanidine salt of chemical formula 1 can be prepared by well-known polymerization processes, and for example, can be prepared by a polycondensation reaction which reacts guanidine salt with a monomer having a diamine group at the temperature of about 180° C. The antifouling agent of chemical formula 1, namely, polyhexamethyleneguanidine salt easily dissolves in water, and approaches to the cell membrane of the organism inducing the fouling by electrostatic attraction force, and binds to the phospholipid, such as phosphatidyl glycerol. Then, the salt decomposes the cell membrane by deranging the membrane structure, and thereby prevents the conglutination of the organism on the sea equipments.

Cuprous oxide ($Cu_2O$) is released from the surface of the paint in forms of copper ion or copper salt, and forms chelate compounds with amino acids or enzymes in the cell, and coagulates protoplasms of the cell. As a result, cuprous oxide prevents the propagation of conglutinative sea animals and plants, which reduces the fouling induced by the sea animals and plants. Therefore the preferable antifouling paint composition according to the present invention includes both of polyhexamethyleneguanidine salt, which has a superior antifouling property for microorganisms, and cuprous oxide, which has a superior antifouling property for sea animals and plants, and thereby has a wide and effective antifouling property for various organisms inducing the fouling. The antifouling agent of chemical formula 2, namely, zinc pyrithione has the molecular weight of 317.7, and is slowly released from the surface of the paint because zinc pyrithione is very slightly soluble in a polar solvent or in a non-polar solvent. The released zinc pyrithione forms complex salts with enzymes of organisms, especially with enzymes having metal ions, decreases the activities of the enzymes, and finally suppresses the growth of the microorganisms, such as slimes.

The antifouling paint composition of the present invention includes a resin of 5 to 20 weight %, a solvent of 3 to 30 weight %, polyhexamethyleneguanidine salt of chemical formula 1 of 0.05 to 20 weight %, a pigment of 1 to 50 weight %, and cuprous oxide ($Cu_2O$) of 22 to 75 weight % and/or zinc pyrithione of the chemical formula 2 of 0.05 to 20 weight %, and optionally further includes a gelling agent of 1 to 5 weight %. When the antifouling paint composition of the present invention includes cuprous oxide ($Cu_2O$), the paint composition preferably includes a resin of 5 to 20 weight %, a solvent of 3 to 25 weight %, polyhexamethyleneguanidine salt of chemical formula 1 of 1 to 15 weight %, cuprous oxide ($Cu_2O$) of 22 to 75 weight % and a pigment of 1 to 19 weight %. Alternatively, when the antifouling paint composition of the present invention includes zinc pyrithione, the paint composition preferably includes a resin of 10 to 15 weight %, a solvent of 20 to 30 weight %, polyhexamethyleneguanidine salt of chemical formula 1 and zinc pyrithione of chemical formula 2 of total 5 to 20 weight %, and a pigment of 40 to 50 weight %. In this case, the amount of the zinc pyrithione is 0.01 to 100 times of the amount of the polyhexamethyleneguanidine salt by weight.

The resins used for the conventional antifouling paint compositions can be non-limitedly used as the resin for the composition of the present invention. Exemplary resin which can be used in the present invention includes synthetic resins such as vinyl resin (for example, polyvinylacetate resin, polyvinyl chloride resin), urethane resin, chlorinated rubber resin, phthalic resin, alkyd resin, epoxy resin, phenol resin, melamine resin, acrylic resin, fluoro resin, and silicone resin, and natural resins such as rosin. In addition, various water-soluble resin or fat-soluble resins can be used with the synthetic or natural resins. The preferable amount of the resin in the total paint composition is 5 to 20 weight %. When the amount of the resin is less than 5 weight %, the adhesion property of the paint composition is deteriorated. When the amount of the resin is more than 20 weight %, the preservation stability of the paint composition is deteriorated.

The solvent which can be used for the antifouling composition of the present invention includes various solvents which is capable of dissolving and dispersing each components of the paint composition. Exemplary solvent includes hydrocarbyl solvent or ketone compound such as xylene, methylethylketone, methylisobutylketone, and the mixtures thereof. The preferable amount of the solvent in the total paint composition is 3 to 30 weight %. When the amount of the solvent is less than 3 weight %, the viscosity of the paint composition unduly increases. When the amount of the solvent is more than 30 weight %, the adhesion property and the antifouling property of the paint composition are deteriorated.

The amount of the antifouling agent of chemical formula 1 in the total paint composition is 0.05 to 20 weight %, preferably 5 to 20 weight %, and more preferably 5 to 15 weight %, and the preferable amount of cuprous oxide ($Cu_2O$) is 22 to 75 weight %. When the amounts of the antifouling agent of chemical formula 1 and cuprous oxide are less than the preferable concentrations, or when only one of the antifouling agent of chemical formula 1 and cuprous oxide is used, the antifouling efficiency of the composition decreases. When the amounts of the antifouling agent of chemical formula 1 and cuprous oxide are more than the preferable concentrations, the physical properties and the preservation stability of the paint composition are deteriorated.

When zinc pyrithione of the chemical formula 2 is used, the preferable amount of the mixture of polyhexamethyleneguanidine salt and zinc pyrithione in the total paint composition is 5 to 20 weight %. If the amount of the mixture is less than 5 weight %, the antifouling efficiency of the composition decreases, and organisms may conglutinate on the sea equipments to induce fouling. If the amount of the mixture is more than 20 weight %, the physical properties and the preservation stability of the paint composition are deteriorated. The amount of zinc pyrithione in the total paint composition is preferably 0.05 to 20 weight %, preferably 5 to 19 weight %, and more preferably 5 to 15 weight %, and is preferably 0.01 to 100 times, more preferably 0.05 to 50 times, and most preferably 0.1 to 10 times of the amount of the polyhexamethyleneguanidine salt by weight. When the amount of the zinc pyrithione is not in the above-described ranges, desirable antifouling efficiency cannot be obtained.

As the pigment for the antifouling paint composition of the present invention, conventional pigments can be non-limitedly used. Exemplary pigment includes metal oxide pigment, organic pigment and the mixtures thereof. The metal oxide pigment includes titanium oxide, zinc oxide, and iron oxide. The preferable amount of the pigment in the total paint composition is 1 to 50 weight %. When the amount of the pigment is less than 1 weight %, the color of the paint composition can be deteriorated. When the amount of the pigment is more than 50 weight %, the weather proof property of the paint composition can be deteriorated.

The antifouling paint composition of the present invention may include various conventional additives. One example of such additives is a gelling agent such as polyamide wax, bentonite, polyethylene wax, and so on. The preferable amount of the gelling agent in the total paint composition is 1 to 5 weight %. When the amount of the gelling agent is less than 1 weight %, the painting work of the paint composition cannot be effectively performed. When the amount of the gelling agent is more than 5 weight %, the viscosity of the paint composition unduly increases.

The antifouling paint composition of the present invention has enough and wide antimicrobial, antimildew, and antialgae property by itself. However, the antifouling paint composition of the present invention optionally includes conventional antimicrobial, antimildew, or antialgae agents. Exemplary conventional antimicrobial, antimildew, or antialgae agent includes 3-iodo-2-propynyl butylcarbamate, diiodomethyl-p-tolylsulfone, 1,2-benzoisothiazolin-3-one, 2-methylthio-4-tert-butylamino-6-cyclopropylamino-s-triazine, 2-(4-thiocyanomethylthio) benzothiazole, 2,3,5,6-tetrachloro-4-(methylsulfonyl) pyridine, 3-(3,4-dichlorophenyl)-1,1-dimethylurea, 2-n-octyl-4-isothiazolin-3-one, tetrachloroisophthalonitrile, N-(fluorodichloromethylthio)-phthalimide, N-dichlorofluoromethylthio-N',N'-dimethyl-N-p-tolylsulfamide, α-[2-(4-chlorophenyl)ethyl]-α-(1,1-dimethylethyl)-1H-1,2,4-triazole-1-ethanol, N,N-dimethyl-N'-phenyl-(fluorodichloromethylthio)-sulphamide, zinc(2-pyridylthio-1-oxide), copper (2-pyridylthio-1-oxide), silver compound, and the mixtures thereof.

The antifouling paint composition of the present invention can be prepared by conventional paint preparing method. For example, a resin is completely dissolved with xylene and small amount of ketone compound. Then a pigment is added thereto, and dispersed with a sand mill. Then the antifouling agents and additives are added to the dispersed mixture, and stirred with a high-speed dissolver. After stirring the mixture, the remaining solvent is added thereto, and stirred to produce the antifouling paint composition of the present invention.

Hereinafter, the preferable examples of the present invention are provided for better understanding of the present invention. However, the following examples are to illustrate the present invention, but the present invention should not be limited by the following examples.

EXAMPLE 1

A vinyl resin of 12 weight % and a rosin of 2 weight % were completely dissolved with a solvent mixture including xylene of 3 weight % and methylisobutylketone of 3 weight %. Then, zinc oxide of 13 weight % was added thereto, and dispersed two times with a sand mill. The antifouling agent of the chemical formula 1 (polyhexamethyleneguanidine salt, wherein X=$H_3PO_4$, $R_1$=H, n=3, and MW=1020) of 7 weight %, cuprous oxide of 50 weight %, and polyamide wax of 3 weight % as a gelling agent were added to the dispersed mixture, and stirred with a high-speed dissolver at 1500 rpm for 30 minutes. Finally, the remaining solvent of methylisobutylketone of 7 weight % was added thereto, and stirred to produce the antifouling paint composition shown in Table 1.

TABLE 1

| Paint composition | Weight % |
| --- | --- |
| Vinyl resin (Union Carbide Corp., Product name: "VINYLITE VYHH") | 12 |
| Rosin (ROM Rosin) | 2 |
| Xylene | 3 |
| Zinc oxide | 13 |
| Cuprous oxide | 50 |
| Polyhexamethyleneguanidine salt | 7 |
| Gelling agent (polyamide wax) | 3 |
| Methylisobutylketone | 10 |
| Total | 100 |

EXAMPLE 2

Except of using polyhexamethyleneguanidine salt of 14 weight % and cuprous oxide of 43 weight %, the antifouling paint composition was prepared according to the method described in Example 1.

COMPARATIVE EXAMPLE 1

Except of using cuprous oxide of 57 weight % and not using polyhexamethyleneguanidine salt, the antifouling paint composition was prepared according to the method described in Example 1.

COMPARATIVE EXAMPLE 2

Except of using polyhexamethyleneguanidine salt of 36 weight % and cuprous oxide of 21 weight %, the antifouling paint composition was prepared according to the method described in Example 1.

COMPARATIVE EXAMPLE 3

Except of not using polyhexamethyleneguanidine salt and cuprous oxide, the paint composition was prepared according to the method described in Example 1.

COMPARATIVE EXAMPLE 4

A mixture of azobisisobutyronitrile of 0.5 weight part and xylene of 10 weight part was added to a mixture of tributyltin methacrylate of 15 weight part, methylmethacrylate of 35 weight part, and xylene of 40 weight part at 80° C. for 3 hours to obtain a polymer. Then, talc of 10 weight part, barium sulfate of 5 weight part, tributyltin fluoride of 10 weight part, cuprous oxide of 20 weight part, and xylene of 40 weight part were added to the obtained polymer of 100 weight part. The mixture was dispersed with a high-speed dissolver at 2500 rpm for 3 hours to produce an antifouling paint composition.

EXAMPLE 3

A vinyl resin and a rosin were completely dissolved with a solvent mixture including xylene and methylisobutylketone. Then zinc oxide and iron oxide were added thereto, and dispersed two times with a sand mill. An antifouling agent mixture including the antifouling agent of the chemical formula 1 (polyhexamethyleneguanidine salt, wherein $X=H_3PO_4$, $R_1=H$, $n=3$, and $MW=1020$) of 7.5 weight % and the antifouling agent of the chemical formula 2 of 7.5 weight % (polyhexamethyleneguanidine salt: zinc pyrithione=5:5), and a gelling agent were added to the dispersed mixture, and stirred with a high-speed dissolver at 1500 rpm for 30 minutes. Finally, the remaining solvent of ketone compound was added thereto, and stirred to produce the antifouling paint composition shown in Table 2.

TABLE 2

| Paint composition | Weight % |
|---|---|
| Vinyl resin (Union Carbide Corp., Product name: "VINYLITE VYHH") | 5 |
| Rosin (ROM Rosin) | 8 |
| Xylene | 10 |
| Zinc oxide | 27 |
| Iron oxide | 17 |
| Polyhexamethyleneguanidine salt of chemical formula 1 | 7.5 |
| Zinc pyrithione of chemical formula 2 | 7.5 |
| Gelling agent (polyamide wax) | 3 |
| Methylisobutylketone | 15 |
| Total | 100 |

EXAMPLE 4

Except of using the antifouling agent mixture including the antifouling agent of chemical formula 1 of 4.5 weight % and the antifouling agent of chemical formula 2 of 10.5 weight % (polyhexamethyleneguanidine salt:zinc pyrithione=3:7), the antifouling paint composition was prepared according to the method described in Example 3.

EXAMPLE 5

Except of using the antifouling agent mixture including the antifouling agent of chemical formula 1 of 10.5 weight % and the antifouling agent of chemical formula 2 of 4.5 weight % (polyhexamethyleneguanidine salt: zinc pyrithione=7:3), the antifouling paint composition was prepared according to the method described in Example 3.

COMPARATIVE EXAMPLE 5

Except of using the antifouling agent of chemical formula 1 of 15 weight %, and not using the antifouling agent of chemical formula 2, the antifouling paint composition was prepared according to the method described in Example 3.

COMPARATIVE EXAMPLE 6

Except of using the antifouling agent of chemical formula 2 of 15 weight %, and not using the antifouling agent of chemical formula 1, the antifouling paint composition was prepared according to the method described in Example 3.

COMPARATIVE EXAMPLE 7

A polyvinylchloride resin of 12 weight part, iron oxide red of 5 weight part, titanium dioxide of 10 weight part, zinc oxide of 10 weight part, and cuprous oxide of 40 weight part were dispersed with a high-speed dissolver at 2500 rpm for 1 hour, and milled with a sand mill to have the particle size of less than 40 µm. The dispersed mixture added to a tank including xylene of 40 weight part, methylisobutylketone of 30 weight part, rosin of 8 weight part, and tricresyl phosphates of 5 weight part, and stirred with a high-speed dissolver at 1500 rpm for 30 minutes to produce the antifouling paint composition.

EXPERIMENTAL EXAMPLE

The antifouling properties of the antifouling paint compositions according to Examples and Comparative examples were determined by the following method. Rolled steel sheets according to the Korean Industrial Standard of KSD 3501 and having the size of 300×300×3.2 mm (width× length×thickness) were sand blasted according to the method of KSM 5569, and coated with a tar vinyl resin for rust inhibiting. Then, the antifouling paint compositions according to Examples and Comparative examples were spray-coated on the steel sheets by 2 times so that the dry-thickness of the coated layer was 150 µm. For each antifouling paint composition, three test pieces were prepared. After drying the test pieces for 1 week at the relative humidity of 75% and the temperature of 25° C., the test pieces were kept under the sea at a depth of about 1 meter in front of Geoje Island of Tongyoung-Si, Republic of Korea. After 12 months, the antifouling properties were measured. The arithmetic mean of three contamination areas in the effective area of 52,000 $mm^2$ which was defined by the line which was 70 mm apart from the top of the test piece, the line which was 30 mm apart from the bottom of the test piece, and each line which was 20 mm apart from the each side of the test piece was calculated, and the results are shown in tables 3 and 4.

TABLE 3

| Antifouling property | | Example 1 | Example 2 | Comparative Example 1 | Comparative Example 2 | Comparative Example 3 | Comparative Example 4 |
|---|---|---|---|---|---|---|---|
| Contamination area | slime | 5 | 5 | 50 | 10 | 100 | 40 |
| | algae | 0 | 0 | 5 | 30 | 40 | 0 |
| | barnacle | 0 | 0 | 0 | 5 | 50 | 0 |

TABLE 4

| Antifouling property | | Example 3 | Example 4 | Example 5 | Comparative Example 5 | Comparative Example 6 | Comparative Example 7 |
|---|---|---|---|---|---|---|---|
| Contamination area | slime | 5 | 15 | 10 | 20 | 25 | 40 |
| | algae | 0 | 0 | 5 | 0 | 0 | 0 |
| | barnacle | 0 | 0 | 0 | 0 | 0 | 0 |

As shown in table 3, the antifouling paint compositions according to Examples 1 and 2 which include polyhexamethyleneguanidine salt of chemical formula 1 and cuprous oxide have superior antifouling property than that of Comparative example 4 which includes mercury or organic tin compound, and is a conventional self-polishing antifouling paint composition. In addition, the paint compositions according to Comparative examples 1 and 2 which include only one antifouling agent or cuprous oxide of less than 22 weight % have insufficient antifouling property. As shown in table 4, the antifouling paint compositions which include polyhexamethyleneguanidine salt of chemical formula 1 and zinc pyrithione of chemical formula 2 have similar or superior antifouling property than the antifouling paint compositions which include only one of polyhexamethyleneguanidine salt and zinc pyrithione, or include cuprous oxide, mercury or organic tin compound. In addition, polyhexamethyleneguanidine salt of chemical formula 1 and zinc pyrithione of chemical formula 2 are not harmful for human-being and sea environment, and suitable as substitutes of mercury or organic tin compound which induce the sea environment contamination. Thus, the antifouling paint composition according to present invention is useful for preventing the fouling of sea equipments such as fishing nets, ships, undersea equipments, and so on.

The invention claimed is:

1. An antifouling paint composition, comprising:
a resin of 5 to 20 weight %;
a solvent of 3 to 30 weight %;
polyhexamethyleneguanidine salt of the following chemical formula 1 of 0.05 to 20 weight %;
a pigment of 1 to 50 weight %; and
cuprous oxide of 22 to 75 weight % and/or zinc pyrithione of the following chemical formula 2 of 0.05 to 20 weight %;

[Chemical formula 1]

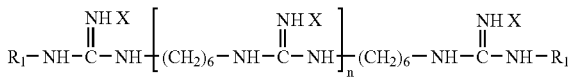

[Chemical formula 2]

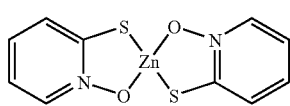

wherein chemical formula 1, X can be the same or different, and at least one of X is an inorganic acid salt or an organic acid salt; $R_1$ can be the same or different, and is a linear or branched alkyl group containing from 1 to 20 carbon atoms, a phenyl group, a chlorophenyl group, a bromophenyl group, an iodophenyl group, a benzyl group, a chlorobenzyl group, a bromobenzyl group, a iodobenzyl group, a phenethyl group, a naphthyl group or a hydrogen; and n is an integer of 1 or more.

2. The antifouling paint composition according to claim 1, wherein the paint composition comprises a resin of 5 to 20 weight %, a solvent of 3 to 25 weight %, polyhexamethyleneguanidine salt of chemical formula 1 of 1 to 15 weight %, cuprous oxide of 22 to 75 weight % and a pigment of 1 to 19 weight %.

3. The antifouling paint composition according to claim 1, wherein the paint composition comprises a resin of 10 to 15 weight %, a solvent of 20 to 30 weight %, polyhexamethyleneguanidine salt of chemical formula 1 and zinc pyrithione of chemical formula 2 of total 5 to 20 weight %, and a pigment of 40 to 50 weight %, and the amount of the zinc pyrithione is 0.01 to 100 times of the amount of the polyhexamethyleneguanidine salt by weight.

4. The antifouling paint composition according to claim 1, wherein X can be the same or different, and at least one of X is selected from the group consisting of HCl, HBr, HI, $HNO_3$, carbonic acid, sulfuric acid, phosphoric acid, acetic acid, benzoic acid, dehydroacetic acid, propionic acid, gluconic acid, sorbic acid, fumaric acid, maleic acid, and epichlorohydrin.

5. The antifouling paint composition according to claim 1, wherein the molecular weight of polyhexamethyleneguanidine salt is 500 to 20,000.

6. The antifouling paint composition according to claim 1, wherein the solvent is selected from the group consisting of xylene, methylethylketone, methylisobutylketone, and mixtures thereof.

7. The antifouling paint composition according to claim 1, wherein the pigment is selected from the group consisting of titanium oxide, zinc oxide, iron oxide, and mixtures thereof.

8. The antifouling paint composition according to claim 1, further comprising a gelling agent of 1 to 5 weight % on the basis of total paint composition.

9. The antifouling paint composition according to claim 1, wherein the resin is selected from the group consisting of vinyl resin, urethane resin, chlorinated rubber resin, phthalic resin, alkyd resin, epoxy resin, phenol resin, melamine resin, acrylic resin, fluoro resin, silicone resin, rosin, and mixtures thereof.

10. The antifouling paint composition according to claim 1, further comprising a compound selected from the group consisting of 3-iodo-2-propynyl butylcarbamate, diiodomethyl-p-tolylsulfone, 1,2-benzoisothiazolin-3-one, 2-methylthio-4-tert-butylamino-6-cyclopropylamino-s-triazine, 2-(4-thiocyanomethylthio) benzothiazole, 2,3,5,6-tetrachloro-4-(methylsulfonyl) pyridine, 3-(3,4-dichlorophenyl)-1,1-dimethylurea, 2-n-octyl-4-isothiazolin-3-one, tetrachloroisophthalonitrile, N-(fluorodichloromethylthio)-phthalimide, N-dichlorofluoromethylthio-N',N'-dimethyl-N-p-tolylsulfamide, α-[2-(4-chlorophenyl)ethyl]-α-(1,1-dimethylethyl)-1H-1,2,4-triazole-1-ethanol, N,N-dimethyl-N'-phenyl-(fluorodichloromethylthio)-sulphamide, zinc(2-pyridylthio-1-oxide), copper (2-pyridylthio-1-oxide), silver compound, the mixtures thereof.

* * * * *